United States Patent [19]
Liaw

[11] Patent Number: 5,526,763
[45] Date of Patent: Jun. 18, 1996

[54] ARTIFICIAL REEF STRUCTURE

[76] Inventor: Chung-Yi Liaw, No. 8-2, Alley 4, Lane 18, Nanking W. Road, Taipei, Taiwan

[21] Appl. No.: 491,678

[22] Filed: Jun. 19, 1995

[51] Int. Cl.$^6$ .................................................. B63B 35/58
[52] U.S. Cl. ............................ 114/264; 114/267; 441/35
[58] Field of Search ..................... 114/219, 264, 114/265, 266, 267, 270; 441/35; 405/219

[56] References Cited

U.S. PATENT DOCUMENTS

| | | | |
|---|---|---|---|
| 235,946 | 12/1880 | Griffith | 441/35 |
| 3,728,749 | 4/1973 | Eby et al. | 114/267 |
| 3,951,384 | 4/1976 | Hildreth | 114/219 |
| 4,357,891 | 11/1982 | Sluys | 114/219 |
| 4,655,156 | 4/1987 | Svirklys et al. | 114/266 |
| 5,251,560 | 10/1993 | Ban et al. | 114/266 |

Primary Examiner—Stephen Avila
Attorney, Agent, or Firm—Bacon & Thomas

[57] ABSTRACT

An artificial reef structure includes a floating platform formed by a number of buoy units combined together and a large number of vertically extending rows of waste tires secured to an under side of the platform to extend to any desired depth and assume any desired configuration. The resiliency of the tires allows the artificial reef structure to be used as a fender, the ring or donut shape of the tires provides cavities in which fish and other sea creatures may breed and feed, and the bulky volume of the reef structure that is formed by the great number of waste tires serves to break up tides and waves and thus protect the seashore and pier and jetty from being damaged by strong tides and waves.

6 Claims, 3 Drawing Sheets

5,526,763

ARTIFICIAL REEF STRUCTURE

FIELD OF THE INVENTION

The present invention relates generally to an artificial reef structure which can be used as both a fender structure and a wave breaker, as well as a fish reef in which fish and other sea creatures breed and feed.

BACKGROUND OF THE INVENTION

It is always desired to provide a wave breaking device along or close to a seashore or pier or jetty to protect them from being damaged by strong tides and waves. On the other hand, it is also desired to have a resilient device located along a pier or jetty to serve as a fender for protecting both the pier and ships from damage due to a violent collision therebetween. Further, it is also desired to a provide an artificial reef which has a plurality of cavities to allow fish and other sea creatures to feed and breed therein for improving ecological prosperity.

Thus it is desirable to provide an artificial reef structure which satisfies the above requirements.

SUMMARY OF THE INVENTION

An object of the present invention is to provide an artificial reef structure which comprises a floating platform under which a "tire tree" is secured to extend to any desired water or sea depth so as to provide the capability of breaking up tides or waves to protect a seashore, pier or jetty from being damaged by strong tides or waves.

Another object of the present invention is to provide an artificial reef structure which comprises a floating platform formed by a combination of a plurality of buoy units under which a plurality of waste tires are secured to provide cavities for fish and other sea creatures to feed and breed.

A further object of the present invention is to provide an artificial reef of which the reef structure is formed by a number of waste tires so as to provide a new way to make use of the great quantity of waste tires.

In accordance with the present invention, there is provided an artificial reef structure comprising a floating platform formed by a number of buoy units combined together and a large number of vertically extending rows of waste tires secured to an under side of the platform to extend to any desired depth and assume any desired configuration. The resiliency of the tires allows the artificial reef structure to be used as a fender, the ring or donut shape of the tires provides cavities in which fish and other sea creatures may breed and feed, and the bulky volume of the reef structure that is formed by the great number of waste tires serves to break or crash tides and waves and thus protect the seashore and pier and jetty from being damaged by strong tides and waves.

BRIEF DESCRIPTION OF THE DRAWINGS

The present invention will be better understood from the following description of preferred embodiments of the present invention, with reference to the attached drawings, wherein.

DETAILED DESCRIPTION OF THE PREFERRED EMBODIMENTS

Figure 1:
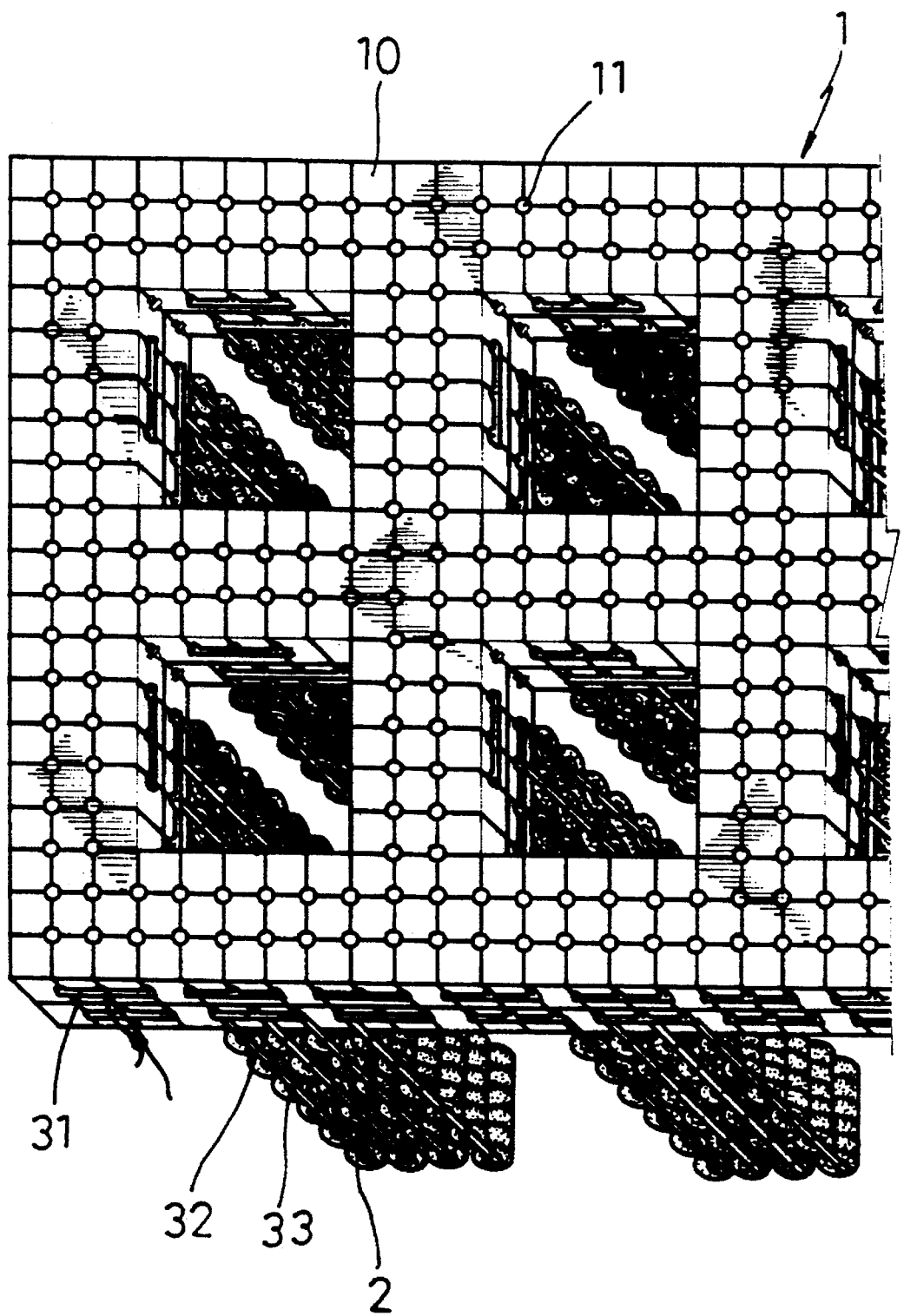
FIG. 1 is a perspective view showing an artificial reef constructed in accordance with a first embodiment of the present invention.
Figure 2:
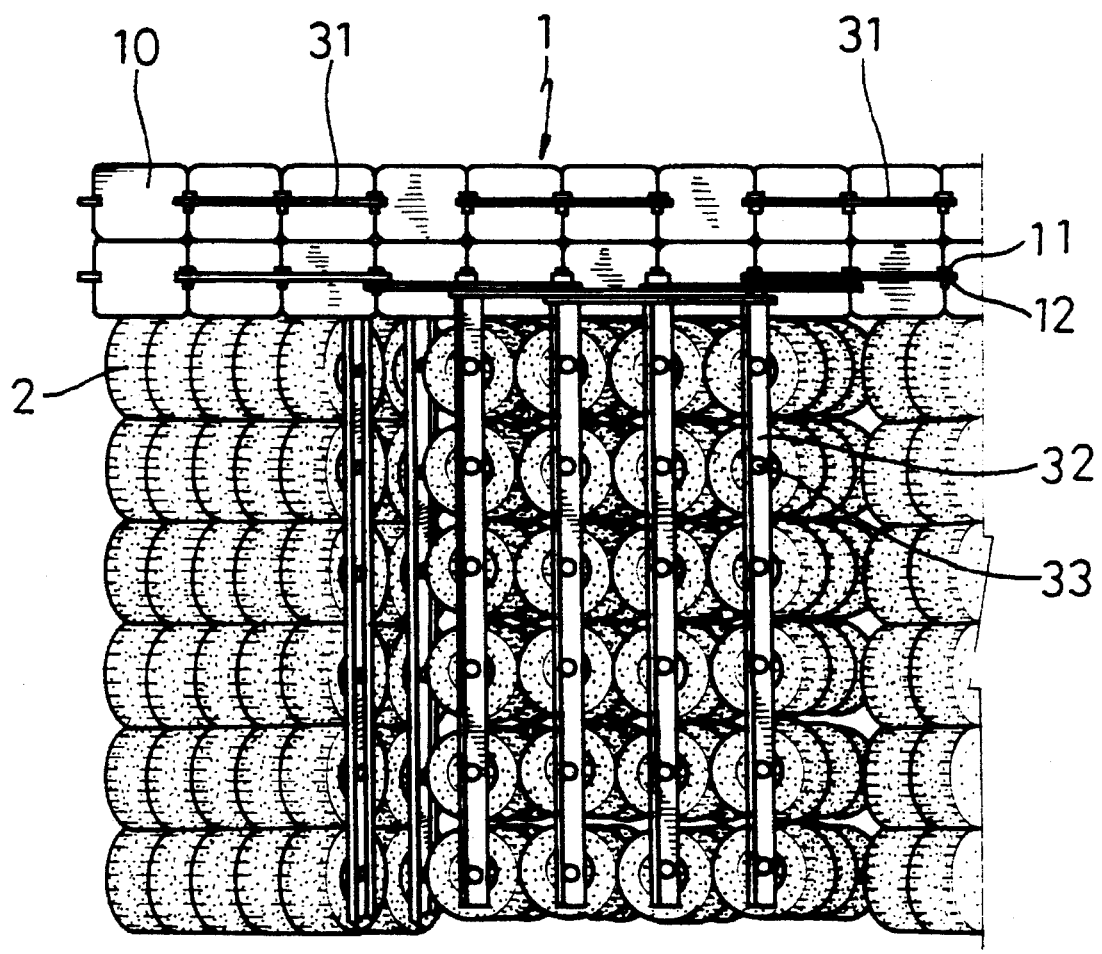
FIG. 2 is a side elevational view showing the artificial reef constructed in accordance with the first embodiment of the present invention.

With reference to the drawings and in particular FIGS. 1 and 2, wherein an artificial reef constructed in accordance with the present invention is shown, the artificial reef comprises a buoy means 1 which may be a combination of a plurality of individual buoy units 10, each having locking lugs 12 formed thereon to allow two adjacent buoy units 10 to be jointed by connecting pegs 11 which are engageable with the locking lugs 12. A floating platform can thus be formed of any desired shape and configuration with any desired number of buoy units 10 extending in any desired direction.

The buoy units 10 are further secured together by means of side connecting plates 31 which may extend across a number of buoy units 10 at any lateral side of the platform. As shown in FIG. 2, the side connecting plates 31 are secured to the locking lugs 12 with the pegs 11 to provide a more secure combination of the buoy units 10.

The artificial reef of the present invention comprises a plurality of vertically extending, elongated posts 32 each having one end secured to one of the connecting pegs 11 secured to the buoy units 10. The posts 32 extend in a direction substantially normal to the platform. The posts 32 may have any desired length and may be different from each other in length.

Each of the posts 32 has a plurality of transverse pins or crossbars 33 extending therefrom and arranged in a spaced manner with a plurality of waste tires 2 fitted over and thus hung on each of the crossbars 33. The crossbars 33, may have a cantilever type free remote end or the remote end thereof may be secured to another post 32. The between two adjacent crossbars 33 that are extending from the same post 32 is sufficient to receive the waste tires 2 hanging on the crossbars 33. The weight of the waste tires 2 lowers the gravity center of the overall structure of the artificial reef so as to stabilize the artificial reef on the sea or water surface.

Figure 3:
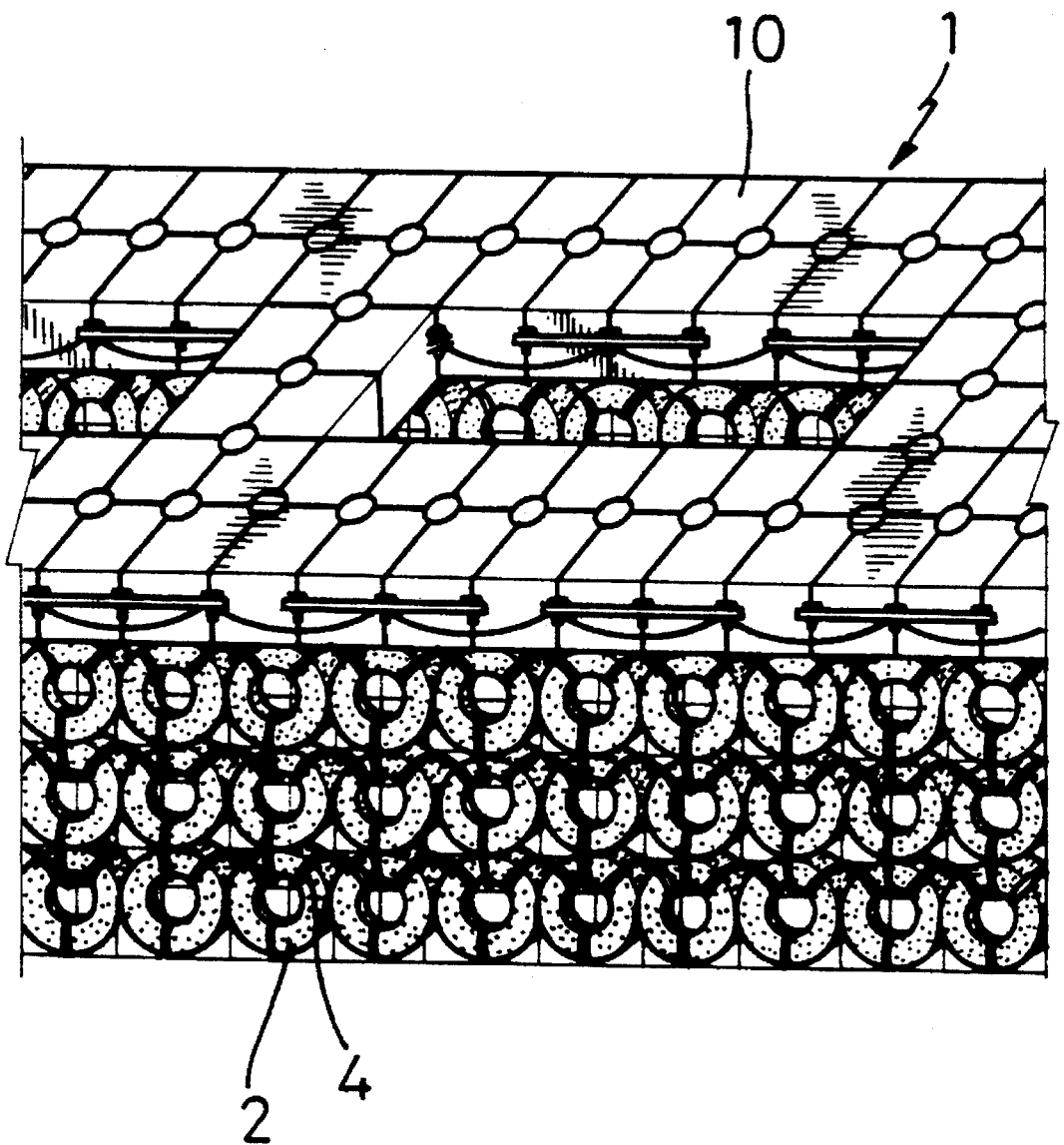
FIG. 3 is a perspective view showing a portion of an artificial reef constructed in accordance with a second embodiment of the present invention.

The securing of the waste tires 2 under the floating platform formed by the buoy units 10 can be done in any one of a number of other suitable manners. For example, the waste tires 2 can be tied to the underside of the buoy platform with, for example, ropes or chains or a net 4, as shown in FIG. 3. The tires 2 can be tied on the platform and on other tires 2 in a an limited manner so as to allow the "tire tree" to extend to any desired depth under water surface or sea surface to satisfy different geographic al requirements.

The floating artificial reef may be anchored in the sea with any known anchoring devices (not shown).

The artificial reef provides the following advantages:

(1) The reef structure that is formed by the waste tires and hung under the floating platform can be used, when appropriately constructed, to breakup and crash sea tides at a sea depth of more than three and half meters so as to reduce the impact of the tides acting upon seashore, pier or jetty. It has been proven that the artificial reef of the present invention has the capability to breakup to 80% of tides or waves.

(2) The reef structure formed by the waste tires can provide places for fish and other sea creatures to feed and breed due to the cavities provided by the ring or donut shapes of the tires and thus provide ecological prosperity.

(3) The reef structure of the present invention is formed by means of a large number of waste tires and thus provides a new way to re-cycle or utilize the waste tires and solve pollution problem caused by the waste tires.

It is apparent that although the invention has been described in connection with the preferred embodiments, it is contemplated that those skilled in the art may make changes to the preferred embodiments without departing from the scope of the invention as defined in the appended claims.

What is claimed is:

1. An artificial reef structure comprising:
   a) a floating platform including an underside;
   b) tire securing means for securing a plurality of vertically extending rows of waste tires to the underside of the platform for extending below a water surface; and
   c) the tire securing means including a plurality of vertically extending elongated posts secured to the platform and extending downwardly from the underside thereof, and each post including a plurality of spaced cross bars extending transversely therefrom for hanging the waste tires.

2. The artificial reef structure as claimed in claim 1, wherein the floating platform comprises a plurality of buoy units secured together with buoy securing means to form the floating platform.

3. The artificial reef structure as claimed in claim 2, wherein the buoy securing means comprises locking lugs formed on each of the buoy units and connecting pegs each of which engages the locking lugs of two adjacent ones of the buoy units.

4. The artificial reef structure as claimed in claim 3, wherein the buoy securing means further comprises side connecting plates each extending across a number of buoy units and secured to the locking lugs of the number of buoy units.

5. The artificial reef structure as claimed in claim 1, wherein the tire securing means comprises ropes which tie the waste tires to the underside of the platform and also tie waste tires to other waste tires in such a manner to allow the tires to form the vertically extending rows.

6. The artificial reef structure as claimed in claim 1, wherein the tire securing means comprises nets which secure the waste tires to the underside of the platform and also secure waste tires to other waste tires in such a manner to allow the tires to form the vertically extending rows.

* * * * *